United States Patent

Olson

[15] 3,684,108
[45] Aug. 15, 1972

[54] CARGO CONTAINER TRAILER TRANSPORTER

[72] Inventor: Clyde W. Olson, Glenwood, Minn.

[73] Assignee: Clyde Machines, Inc., Glenwood, Minn.

[22] Filed: April 26, 1971

[21] Appl. No.: 137,189

[52] U.S. Cl. .......................... 214/84, 188/75, 280/99
[51] Int. Cl. ............................................... B60p 1/52
[58] Field of Search ..... 214/84; 193/35 SS; 280/79.1; 188/75; 280/99; 104/44, 45, 35

[56] References Cited

UNITED STATES PATENTS 3,243,062 3/1966 Frassetto .................... 214/84
3,561,625 2/1971 Dioguardi .................... 214/84

*Primary Examiner*—Albert J. Makay
*Attorney*—Merchant & Gould

[57] ABSTRACT

A frame having four wheels mounted thereunder with a hitch attached thereto for steering movements of all four wheels and brakes attached to the rear wheels and the hitch for operating on the rear wheels when the hitch is raised to a non-operative position, rollers affixed to the frame in rows extending from one side thereof to the other and defining an upwardly directed container receiving surface with manually operable container stops along each side of the trailer, and a generally centrally located pivot and four rollers positioned therearound with the rotational axes thereof oriented horizontally and along radii extending outwardly from the pivot with hydraulic means attached to the pivot and each of the rollers for moving them upwardly above the container receiving surface for allowing containers positioned thereon to be freely rotated or downwardly below the container receiving surface so that containers may be loaded and unloaded from the trailer.

7 Claims, 12 Drawing Figures

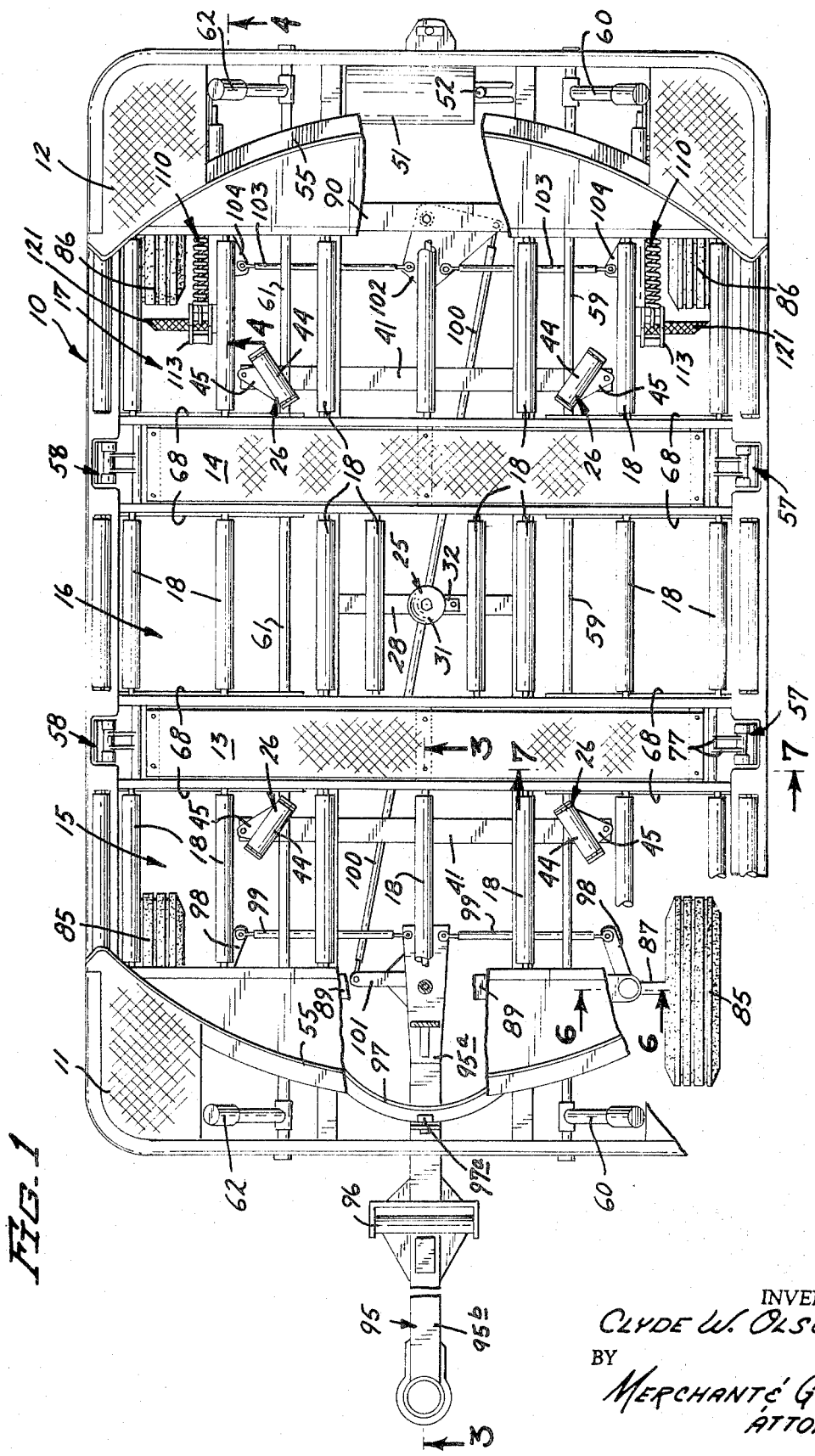

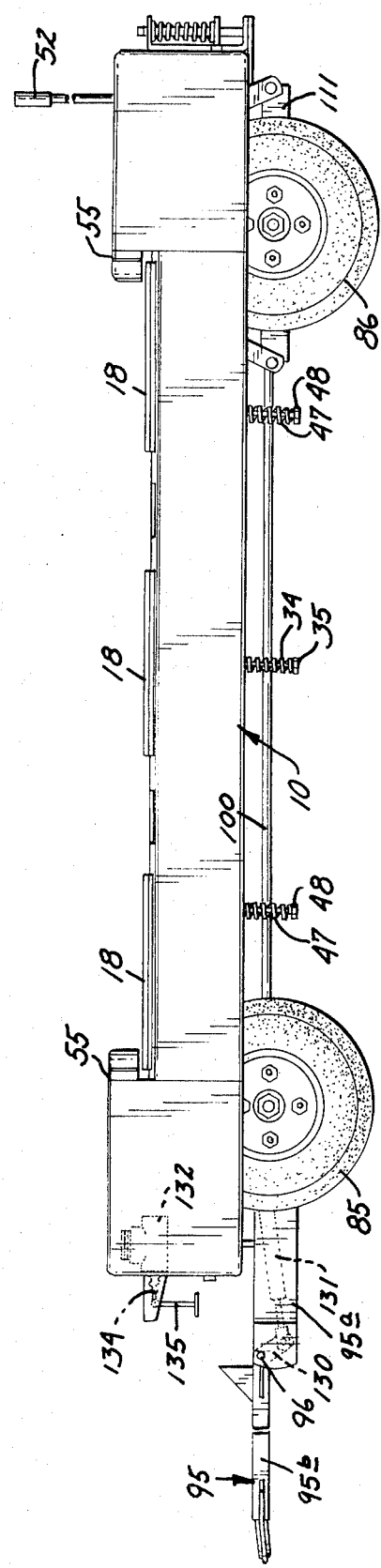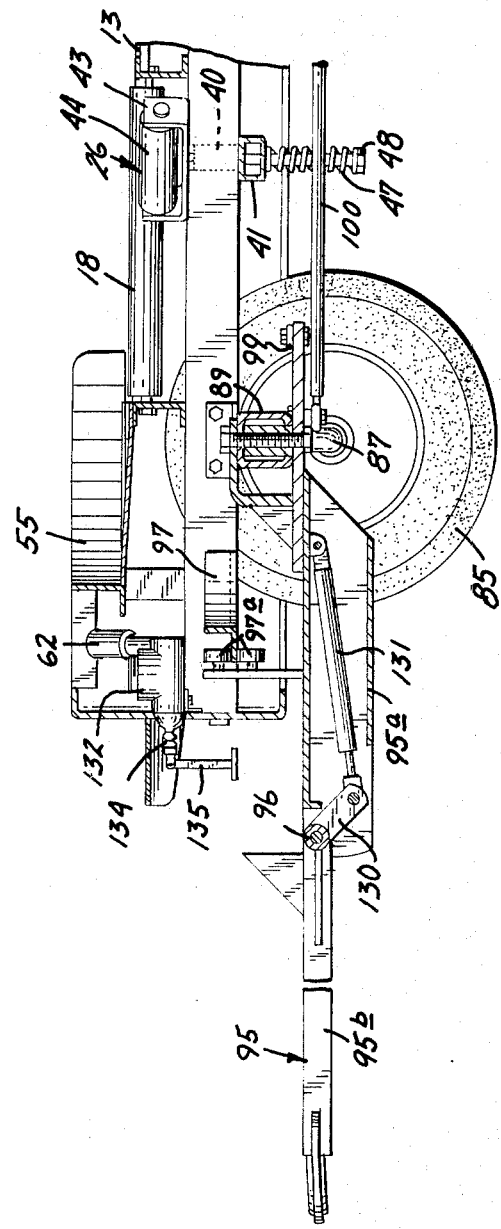

INVENTOR.
CLYDE W. OLSON
BY MERCHANT & GOULD
ATTORNEYS

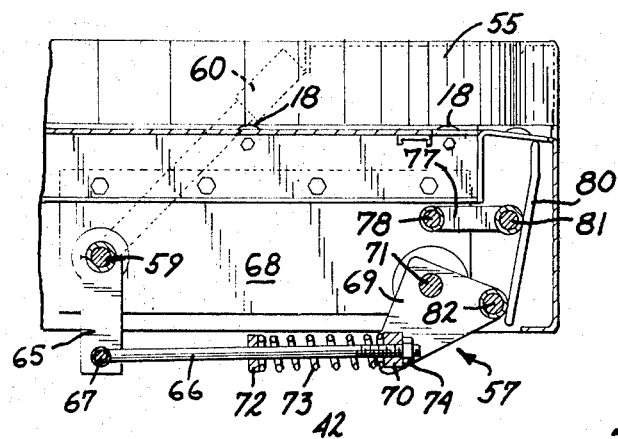
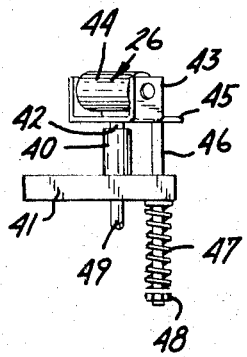
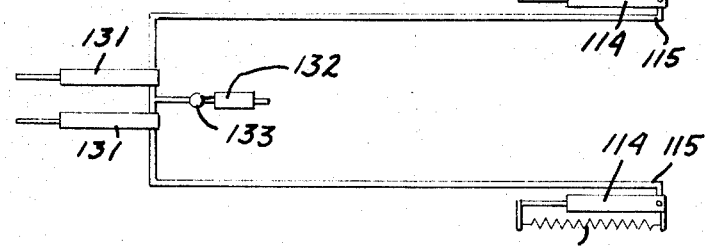
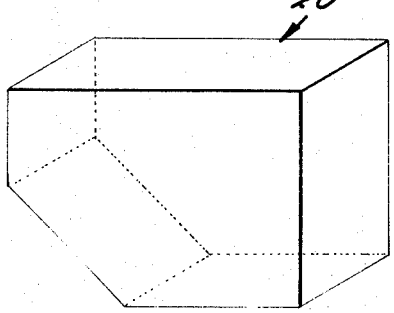
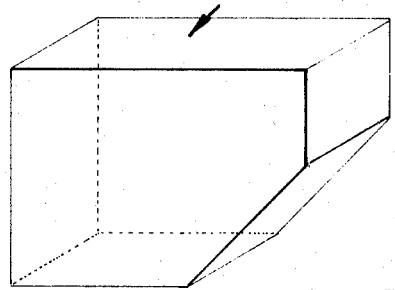

CARGO CONTAINER TRAILER TRANSPORTER

BACKGROUND OF THE INVENTION

1. Field of the Invention

At the present time large containers, utilized for transporting luggage, mail and other cargo in large airplanes, must be transported about the air terminals to and from airplanes with a minimum of effort and maximum speed. These containers are substantially box-shaped with one truncated corner so that, when they are positioned in pairs with the truncated corners directed outwardly and downwardly, they substantially conform to the inner contours of a section of an airplane cargo hold. Equipment for transporting the containers must provide for movement of the containers in substantially any direction onto and off from the equipment.

2. Description of the Prior Art

Prior art trailers were constructed with a track-like bed formed thereon, having upwardly directed sides with rollers mounted therebetween for the ready movement of containers from one end to the other thereof, which bed was affixed to the frame of the trailer for 360° rotation about a vertical axis. However, because the entire container receiving bed of the trailer rotates, the trailer is relatively expensive and difficult to construct and increases the weight which must be rotated. Further, because the entire bed of the trailer rotates the controls for operating the various working parts of the trailer also rotate and an operator must move with the trailer so as to remain within reach of the controls.

SUMMARY OF THE INVENTION

The present invention pertains to an improved cargo container trailer transporter including a frame having a plurality of wheels attached thereto for movement over the ground and a plurality of rollers defining an upwardly directed container receiving surface, generally centrally located pivot means and a plurality of roller means spaced from said pivot means are affixed to the frame for movement between a position below the container receiving surface and a position above the container receiving surface, said roller means each including at least one roller positioned with its rotational axis oriented generally radially relative to the central pivot means, and means affixed to said pivot means and each of said roller means for moving said means between said two positions.

It is an object of the present invention to provide an improved cargo container trailer transporter.

It is a further object of the present invention to provide an improved cargo container trailer transporter wherein means are included for rotating only the container on the trailer when such reorientation is necessary.

It is a further object of the present invention to provide an improved cargo container trailer transporter having controls for operating container stops and the container rotating apparatus readily available to an operator and non-rotating with the container.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in top plan of an improved cargo container trailer transporter, portions thereof broken away and shown in section;

FIG. 2 is a view in side elevation of the apparatus illustrated in FIG. 1;

FIG. 3 is an enlarged sectional view as seen from the line 3—3 in FIG. 1;

FIG. 7 is an enlarged sectional view as seen from the line 7—7 in FIG. 1;

FIG. 8 is an enlarged fragmentary view of one of the roller means in FIG. 1;

FIG. 10 is a schematic diagram of the hydraulic system for operating the pivot means and roller means illustrated in FIG. 1;

FIG. 11 is a schematic diagram of the hydraulic system for operating the brakes of the apparatus illustrated in FIG. 1; and FIG. 12 is a view illustrating a pair of containers oriented in the normal position for positioning on an airplane.

DESCRIPTION OF THE PREFERRED EMBODIMENT

Figure 4:
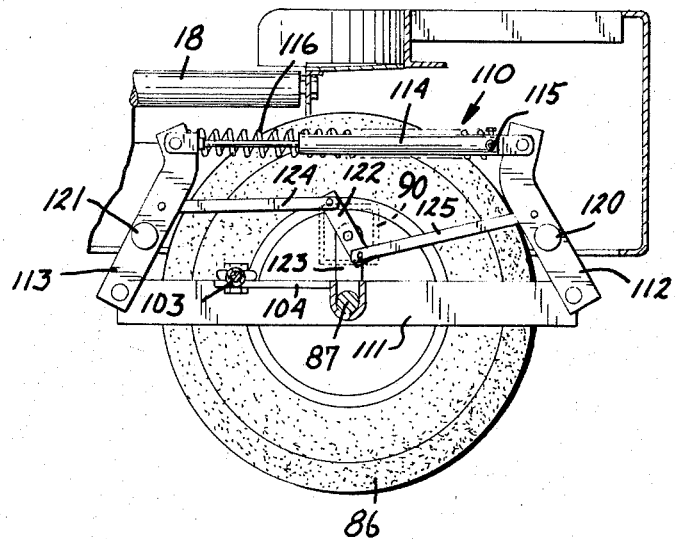
FIG. 4 is an enlarged sectional view as seen from the line 4—4 in FIG. 1.

In the figures the numeral 10 generally designates an elongated generally rectangular frame or trailer bed. The frame 10 is constructed with walkways 11 and 12 extending transversely thereacross at the front and rear ends thereof, respectively, and two smaller walkways 13 and 14 extending transversely across the frame 10 and spaced between the end walkways 11 and 12 to define three openings 15, 16 and 17 therebetween. A plurality of rollers 18 are rotatably engaged in the openings 15, 16 and 17 in parallel spaced apart relationship with the rotational axes thereof parallel with the longitudinal axis of the frame 10. The three rows of rollers 18 cooperate to define an upwardly directed container receiving surface on the trailer.

Referring to FIG. 12, a pair of cargo containers 20 and 21 are illustrated. Each of the containers 20 and 21 is generally box-shaped with one edge or corner truncated so that the containers 20 and 21 in combination and oriented with the truncated edges or corners directed outwardly and downwardly, as illustrated in FIG. 12, generally conform to the contours of the cargo hold in airplanes, such as the B747, DC–10 and L–1011 aircraft. The trailer, which is the subject of this description, is designed to transport a single container such as 20 or 21. In general, the container 20 or 21 will be placed on the rollers 18 of the trailer in an upright position as illustrated in FIG. 12 with no particular attention being paid to the orientation of the truncated portion of the container 20 or 21. Prior to moving the container 20 or 21 from the trailer onto a device for loading the pair of containers 20 and 21 into an airplane, the container 20 or 21 must be oriented so that it can be moved directly onto the loading device in the desired orientation without further rotation thereof.

Figure 9:
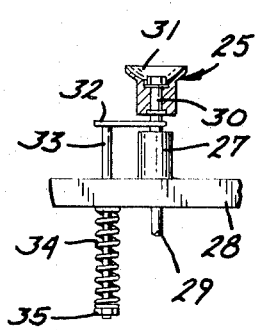
FIG. 9 is a fragmentary view of the pivot means illustrated in FIG. 1.

To accomplish rotation of a container 20 or 21 on the trailer, pivot means generally designated 25 are positioned approximately centrally within the opening 16 between a pair of rollers 18 and four roller means generally designated 26 are spaced from the pivot means 25 so as to lie in the openings 15 and 17. Referring to FIG. 9, a fragmentary view of the pivot means 25 is illustrated. A single acting hydraulic ram 27 is fixedly positioned on a cross bar 28 of the frame 10 approximately centrally within the opening 16 between a pair of rollers 18. The ram 27 has a single conduit 29 in communication with the cylinder thereof and a connecting rod 30, one end of which is connected to a piston within the cylinder, extends vertically upwardly therefrom. The upper end of the rod 30 has an upwardly directed cup-shaped pivot member 31 rotatably affixed thereto. The ram 27 is constructed so that the lower position of the pivot member 31 is slightly below the surface defined by the rollers 18 and upon pressure being applied to the conduit 29 the pivot member 31 is moved upwardly a limited distance above the surface defined by the rollers 18. A horizontally oriented plate 32 is fixedly attached to the rod 30, so that it is adjacent the cylinder of the ram 27 when the pivot member 31 is in its lower position, and a rod 33 is affixed to the plate 32 in downwardly extending relationship parallel with but spaced from the rod 30. The rod 33 extends downwardly through a hole in the beam 28 and a compression spring 34 is coaxially engaged thereover beneath the beam 28. A stop 35, which may be a nut and washer or the like, is affixed to the lower end of the rod 33 to maintain the spring 34 coaxially engaged therewith. As fluid pressure is applied to the ram 27 and the rod 30 and pivot member 31 move upwardly, the plate 32 and rod 33 move upwardly also and the spring 34 is compressed between the stop 35 and the beam 28. When pressure is removed from the conduit 29, the spring 34 forces the rod 30 and pivot member 31 back into the lower position and forces fluid from the ram 27.

Each of the roller means 26 is substantially equal and a single roller means 26 is illustrated in detail in FIG. 8. A ram 40 is fixedly engaged on a beam 41 of the frame 10 in generally vertically upwardly extending relationship so that a connecting rod 42, affixed to the hydraulic cylinder of the ram 40, extends vertically upwardly therefrom. A horizontally elongated U-shaped bracket 43 is fixedly attached to the upper end of the rod 42 of ram 40 and a roller 44 is rotatably mounted therein so that a portion of the surface of the roller 44 extends above the bracket 43. An outwardly extending ear 45 is integrally formed on the bracket 43 and a downwardly extending rod 46 is fixedly attached thereto. The rod 46 extends downwardly parallel with and spaced from the ram 40 so as to extend through a hole in the beam 41 and a substantial distance therebelow. A compression spring 47 is coaxially engaged over the rod 46 and maintained in position by a stop 48, which may be a nut and washer or the like. The ram 40 is a single-acting ram and has a conduit 49 in communication therewith for applying fluid pressure thereto. The roller means 26 operates in the manner described above for the pivot means 25.

The four roller means 26 are spaced from the pivot means 25 a substantial distance and each of the rollers 44 is mounted with the rotational axis thereof oriented generally radially relative to the pivot member 31 of the pivot means 25. Referring to FIG. 10, the conduit 29 in communication with the ram 27 and the conduits 49 in communication with the rams 40 are all connected to a relief valve 50 which is in turn connected to a main hydraulic pump 51. In the present embodiment the hydraulic pump 51 is manually operable through a handle 52. Thus, the roller means 26 and pivot means 25 are all simultaneously movable in a vertical direction through manipulation of the handle 52. With a container 20 or 21 situated on the rollers 18, the handle 52 can be operated to raise the pivot means 25 and roller means 26 and raise the container 20 or 21 slightly above the surface defined by the rollers 18. Since the rollers 44 of the roller means 26 lie along radii of a circle, the center of which is the pivot member 31, the container 20 or 21 situated on the trailer can be quickly and easily rotated to any desired orientation, whereupon the relief valve 50 can be operated to lower it back onto the surface of the rollers 18. Arcuate guide members 55 are mounted adjacent each of the walkways 11 and 12 so as to extend generally transversely across the frame 10 and lie coaxial with the pivot means 25. The guide members 55 extend upwardly adjacent the walkways 11 and 12 and serve to maintain the container 20 or 21 correctly positioned on the pivot member 31 and rollers 44 during rotary movement thereof. It should be understood that the pivot means 25 and roller means 26 illustrated in the present embodiment are a preferred form because of their simplicity but many modifications and alterations thereof may be devised by those skilled in the art.

Referring to FIG. 1, two stop means, generally designated 57, are affixed to the frame 10 adjacent the left edge thereof and two stop means, generally designated 58, are affixed to the frame 10 adjacent the right edge thereof. In the present embodiment one stop means 57 and one stop means 58 is affixed at each end of the walkway 13 and one stop means 57 and one stop means 58 is affixed at each end of the walkway 14. The stop means 57 are connected to and operable with an elongated shaft 59 extending the length of the frame 10 and having a handle 60 at each end thereof. The stop means 58 are connected to and operable with an elongated shaft 61 extending the length of the frame 10 and having a handle 62 at each end thereof. The stop means 57 and 58 are designed to engage the outer edges of a container 20 or 21 situated on the rollers 18 and maintain the container 20 or 21 properly positioned during transportation thereof. Both of the stop means 57 and both of the stop means 58 are substantially similar and an explanation of the operation thereof is provided in conjunction with FIG. 7 which illustrates a single stop means 57 in detail.

In FIG. 7, the shaft 59 has a pair of spaced apart, elongated downwardly extending plates 65 (only one shown) attached thereto for movement therewith. One end of an elongated rod 66 is pivotally engaged between the plates 65 by means of a pin 67 extending therethrough. A pair of large rectangular shaped plates 68 (see FIGS. 1 and 7) are affixed to the frame 10 along either side of the walkway 13 in downwardly extending relationship. A pair of generally triangularly spaced plates 69 (only one shown) are affixed together in parallel spaced apart relationship by means of a block 70 having an opening therethrough and pivotally pinned therebetween. The plates 69 are pivotally mounted between and parallel with the plate 68 by means of an elongated pin 71 extending through openings in the plates 69 and pivotally engaged in the plates 68. The block 70 and opening therethrough are situated so as to receive the free end of the rod 66 therethrough. A stop or washer 72 is affixed approximately centrally to the rod 66 and a compression spring 73 is coaxially engaged over the rod 66 between the stop 72 and the block 70. The free end of the rod 66 is threaded and a nut 74 is threadedly engaged on the free end thereof extending through the block 70. A pair of elongated links (only one shown) are pivotally mounted in spaced apart relationship between the plates 68 by means of a pin 78. The pin 78 is spaced upwardly from the pin 71 and the links 77 extend generally horizontally therefrom. A generally vertically oriented plate 80, which is positioned perpendicular to and between the plates 68, serves as a container stop member. The plate 80 has upper and lower knuckles affixed thereto with the upper knuckle being pivotally pinned between the links 77 by means of a pin 81 and the lower knuckle being pivotally pinned between the triangular shaped plates 69 by means of a pin 82. The pin 82 extends through the triangularly shaped plate 69 at a lower corner thereof, the block 70 is positioned between the plate 69 at the opposite corner thereof and the pin 71 extends between the triangularly shaped plate 69 at approximately the apex thereof.

In the operation of the stop means 57, the stop member or plate 80 is illustrated in the retracted position in FIG. 7. Movement of the handle 60 and rotation of the shaft 59 in a counter-clockwise direction produces rotation of the plate 65 and longitudinal movement of the rod 66 towards the triangularly shaped plate 69. As the rod 66 moves toward the plate 69 the spring 73 produces a force on the plate 69 tending to rotate them in a counterclockwise direction. Rotation of the plate 69 produces a consequent upward movement of the plate or stop member 80 and consequent rotation in a counterclockwise direction of the links 77, which tend to maintain the plate 80 in a vertical orientation. If the handle 60 is moved sufficiently far to rotate the plates 65 beyond an over-center position (the longitudinal axes of the plates 65 past the point at which they are parallel with the longitudinal axis of the rod 66) the plates 80 are locked in an upper or container engaging position. To release the plates or stop members 80 the handle 60 is then rotated in a clockwise direction into the position illustrated in FIG. 7. A handle 60 is provided at each end of the shaft 59 and a handle 62 is provided at each end of the shaft 61 so that the stop means 57 and 58 may be raised or lowered from either end of the trailer.

Figure 6:
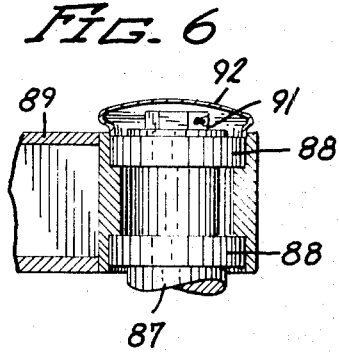
FIG. 6 is an enlarged sectional view as seen from the line 6—6 in FIG. 1.

Two front wheels 85 and two rear wheels 86 are positioned beneath the front and rear corners of the frame 10 in the following manner. Each of the front and rear wheels 85 and 86 are rotatably mounted on one arm of an L-shaped axle 87. The other or perpendicular arms of the axles 87 for each of the wheels 85 and 86 extends vertically upwardly through an opening having bearings 88 therein (see FIG. 6) at each end of transversely extending elongated front and rear bars 89 and 90, respectively. Thus, each of the front wheels 85 and each of the rear wheels 86 are mounted for rotation about their own horizontal axis and for pivotal movements about a vertical axis extending through the vertically oriented arm of the axle 87 mounting the particular wheel 85 or 86. The upper end of each of the axles 87, which extends through the bearings 88 has a washer and nut assembly 91 threadedly engaged thereon to prevent the extraction of the axle 87 from the bearings 88. A cover 92 is frictionally engaged over the upper end of the opening to at least partially protect the nut and washer assembly 91 and bearings 88 from dirt and damage.

The front and rear bars 89 and 90 are fixedly attached to the underside of the frame 10 and an elongated hitch 95 is pivotally affixed to approximately the center of the front bar 89. The hitch 95 extends forwardly of the frame 10 and provides a means for attaching a draft device to the trailer. The hitch 95 is formed of two elongated portions, 95a and 95b, pivotally joined at 96 with the rear portion 95a thereof extending from rearwardly of the front bar 89 somewhat beyond the front of the frame 10 to the pivot point 96 and the forward portion 95b of the hitch 95 extending forwardly from the pivot point 96. The front portion 95b of the hitch 95 is pivotable between a forwardly extending generally horizontal position and an upwardly extending position. The hitch 95 is engaged with an arcuate guide member 97 on rollers 97a, affixed beneath the frame 10, which guides the pivotal movements of the hitch 95. Each of the axles 87 connected to the front wheels 85 has a rearwardly extending ear 98 fixedly attached thereto for rotation therewith. Each of the ears 98 is connected to a rear end of the rear portion 95a of the hitch 95 by means of elongated links 99 so that pivotal movement of the hitch 95 in the horizontal plane pivots the front wheels 85 in the direction of such movement in a normal steering action. One end of an elongated link 100 is connected to an ear 101, which is affixed in transversely extending relation to the rear portion 95a of the hitch 95, and the other end is connected to a transversely outwardly extending corner of an irregularly shaped plate 102. Plate 102 is pivotally affixed to the rear bar 90 and a pair of elongated links 103 are connected between the plate 102 and ears 104 extending transversely inwardly from the rear axles 87. The link 100 and the links 103 are affixed to the plate 102 so that the rear wheels 86 are pivoted about the vertical axes of their associated axles 87 in a direction opposite to the pivotal movement of the front wheels 85, and simultaneously therewith, during horizontal pivotal movements of the hitch 95. Thus, the front wheels 85 and rear wheels 86 pivot in opposite directions to provide accurate steering of the trailer, a short turning radius and good tracking behind a draft vehicle.

Figure 5:
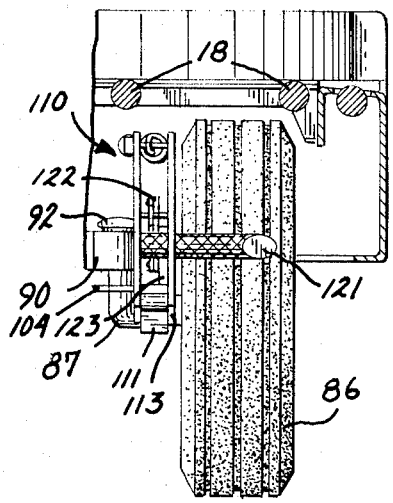
FIG. 5 is a fragmentary detail in front elevation of the braking mechanism, portions thereof broken away and portions thereof shown in section.

Brake means, generally designated 110, are affixed to the frame 10 adjacent each of the rear wheels 86 for operation thereon. Each of the brake means 110 are similar and similar numbers are given to similar parts thereof. Referring to FIGS. 4 and 5, an elongated bar 111 is fixedly attached to the axle 87 in a generally horizontal relationship so as to extend approximately parallel with the plane of the wheel 86. A pair of generally upwardly extending links 112 are pivotally attached on either side of one end of the bar 111 and a pair of generally upwardly extending links 113 are pivotally attached at either side of the opposite end of the bar 111. One end of the body of a single-acting hydraulic ram 114 is pivotally connected between the upper ends of the pair of links 112 and the outwardly projecting end of the connecting rod of the ram 114 is pivotally connected between the upper ends of the links 113. The ram 114 has a conduit 115 in communication therewith and operates such that the ram 114 causes separating movements of the upper ends of the links 112 and 113 when pressure is applied to the conduit 115. A tension spring 116 is engaged between the upper ends of the links 112 and the upper ends of the links 113 so that rotational movement of the upper ends of the links 112 away from the upper ends of the links 113 produces a tension on the spring 116 tending to return the upper ends towards each other. A knurled rod 120 is affixed to the links 112, at approximately their vertical center, so as to extend horizontally and generally perpendicularly outwardly therefrom adjacent to and parallel with the periphery of the wheel 86. A second knurled rod 121 is affixed to the links 113 in a similar fashion and extends adjacent to the outer periphery of the wheel 86 on approximately the opposite side thereof. An elongated plate 122 is rotatably affixed at approximately its longitudinal center to an ear 123, which is fixedly attached in upwardly extending relationship to approximately the center of the bar 111. One end of an elongated link 124 is pivotally engaged to one end of the plate 122 and the other end of the link 124 is pivotally attached between the pair of links 113. A second elongated link 125, similar to link 124, has an end pivotally attached to the opposite end of the plate 122 with the opposite end thereof pivotally connected between the links 112. The entire assembly of the plate 122 and links 124 and 125 insure equal rotational movements of the links 112 and 113 relative to the wheel 86.

In the operation of the brake means 110 the spring 116 normally biases the links 112 and links 113 toward each other so that the knurled rods 120 and 121 frictionally engage the outer periphery of the wheel 86 and operate as a brake thereon. The plate 122 and links 124 and 125 insure that both knurled rods 120 and 121 engage the outer periphery of the wheel 86 simultaneously. As pressure is applied to the conduit 115 and the ram 114 operates to force the links 112 and 113 apart and disengage the knurled rods 120 and 121 from the periphery of the wheel 86. Again the assembly of plate 122 and links 124 and 125 operate to insure that both knurled rods 120 and 121 are disengaged from the periphery of the wheel 86. The tension of the spring 116 is such that whenever fluid pressure on the conduit 115 is removed the spring 116 forces the fluid from the ram 114 through the conduit 115. While a specific embodiment of brake means 110 is illustrated, it should be understood that other embodiments might be devised by those skilled in the art.

A pair of spaced apart downwardly extending ears 130 are fixedly attached to the front portion 95b of the hitch 95 for pivotal movements therewith. The bodies of a pair of single acting hydraulic rams 131 are pivotally attached to the underside of the rear portion 95a of the hitch 95 with the outwardly extending ends of the associated connecting rods being pivotally attached to the downwardly extending ears 130 so that upward movement of the forward portion 95b of the hitch 95 extends the rams 131 outwardly and downward movement thereof produces a retraction of the rams 131. As can be seen in FIG. 11, the conduits 115 in communication with the rams 114 of the brake means 110 are in direct communication with the rams 131. Since the rams 114 and the rams 131 are all single acting, raising the forward portion 95b of the hitch 95 to extend the rams 131 relieves the fluid pressure on the conduits 115 and the spring 116 forces the fluid from the rams 114 into the rams 131. In this embodiment the springs 116 have sufficient energy to force the fluid from the rams 114 and into the rams 131 to raise the forward portion 95b of the hitch 95 whenever the hitch 95 is released. As previously described, when the fluid is forced from the ram 114 the knurled rods 120 and 121 are moved into engagement with the wheel 86 and provide braking action. Conversely, when the forward portion 95b of the hitch 95 is pivoted downwardly the rams 131 contract and force fluid therefrom through the conduit 115 into the rams 114. Applying the fluid under pressure to the rams 114 causes extension thereof and consequent movement of the knurled rods 120 and 121 away from the periphery of the wheel 86 in each of the brake means 110.

A master cylinder 132 is in communication with the rams 131 through a valve 133. Referring to FIG. 3, the master cylinder 132 has a pump 134 at one end thereof, which is adapted to force additional fluid into the rams 131, conduits 115 and rams 114 upon reciprocating movements thereof. An actuator 135 is pivotally attached to the pump 134 and normally extends downwardly in a non-operative position to prevent actuation of the pump 134. When the actuator 135 is pivoted upwardly so that the axis thereof extends horizontally outwardly from the pump 134, upward pivotal movement of the forward portion of the hitch 95 engages the actuator 135 to operate the pump 134. Since the hydraulic system including the rams 131, conduit 115 and rams 114 is a closed system including two sets of single-acting rams, it is imperative that the system contain the right amount of fluid for the simultaneous and opposite action of the rams 131 and 114. While a specific embodiment of the brake system is illustrated, it should be understood that other embodiments may be devised by those skilled in the art.

Thus, a cargo container trailer transporter is disclosed wherein a cargo container can be quickly and easily loaded or unloaded therefrom and the container is rotatable throughout 360°, on the trailer, without the necessity of rotating major portions of the trailer. Further, all of the controls for the trailer remain stationary so that the operator does not have to follow the container as it rotates. The trailer is provided with a braking system whereby the brakes are automatically applied when the hitch is released and, because of the action of the springs 116 the forward portion 95b of the hitch 95 rotates upwardly whenever it is released. In addition to the above, novel container stops are provided to prevent the container from inadvertently falling off the trailer. While I have shown and described a specific embodiment of this invention and the various portions thereof, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. An improved cargo container trailer transporter comprising:
    a. a frame having a plurality of wheels rotatably affixed thereto for movement of the trailer over the ground, said frame defining front and rear ends and two sides of the trailer;
    b. a plurality of spaced apart rollers rotatably affixed to said frame for defining at least a portion of an upwardly directed container receiving surface;
    c. pivot means affixed to said frame generally centrally of said container receiving surface and vertically movable relative to said surface a limited distance above and below said surface;
    d. a plurality of roller means affixed to said frame in spaced relation from said pivot means each including at least one rotatably mounted and vertically movable roller the rotational axis thereof being oriented generally radially relative to said pivot means; and
    e. means affixed to said pivot means and each of said roller means for moving said pivot means and said roller means substantially simultaneously in a vertical direction.

2. An improved cargo container trailer transporter as set forth in claim 1 wherein the means affixed to said pivot means and each of said roller means includes hydraulic cylinders affixed to each thereof and operatively connected by hydraulic conduits to an actuator.

3. An improved cargo container trailer transporter as set forth in claim 1 including a hitch pivotally attached to the frame for movement between a first and second position and brake means attached to said frame adjacent at least some of the wheels and operative thereon, said brake means further being connected to said hitch for operating on said wheels upon movement of said hitch from said first to said second position.

4. An improved cargo container trailer transporter as set forth in claim 1 wherein the plurality of spaced apart rollers are formed into a plurality of transversely oriented parallel rows of rollers with each row extending from approximately one side of the trailer to the other side thereof.

5. An improved cargo container trailer transporter as set forth in claim 4 including in addition container stops affixed to the frame at each side of the trailer and operable between a container engaging position and a retracted position.

6. An improved cargo container trailer transporter as set forth in claim 5 wherein the container stops include a plurality of members pivotally mounted for generally vertical movement between the container engaging and retracted positions and an actuator mechanically linked to each of said members through spring biased, over-center means.

7. An improved cargo container trailer transporter as set forth in claim 1 wherein the plurality of wheels include two front wheels and means attached thereto for simultaneous pivotal steering movements about vertical axes therethrough and two rear wheels and means attached thereto for simultaneous pivotal steering movements about vertical axes therethrough and linking means attached to said attaching means of said front and rear wheels for causing simultaneous pivotal movements of said front and rear wheels in opposite directions.

* * * * *